(12) United States Patent
Huang (10) Patent No.: US 9,207,793 B2
(45) Date of Patent: Dec. 8, 2015

(54) TOUCH PANEL AND TOUCH DETECTING METHOD THEREFOR

(71) Applicant: Shanghai Tianma Micro-Electronics Co., Ltd., Shanghai (CN)

(72) Inventor: Zhongshou Huang, Shanghai (CN)

(73) Assignee: Shanghai Tianma Micro-Electronics Co., Ltd., Shanghai (CN)

( * ) Notice: Subject to any disclaimer, the term of this patent is extended or adjusted under 35 U.S.C. 154(b) by 47 days.

(21) Appl. No.: 14/091,005

(22) Filed: Nov. 26, 2013

(65) Prior Publication Data

US 2014/0184536 A1    Jul. 3, 2014

(30) Foreign Application Priority Data

Dec. 27, 2012  (CN) .......................... 2012 1 0581827

(51) Int. Cl.
  *G06F 3/041*  (2006.01)
  *G06F 3/044*  (2006.01)
(52) U.S. Cl.
  CPC ................ *G06F 3/041* (2013.01); *G06F 3/044* (2013.01); *G06F 3/0416* (2013.01)

(58) Field of Classification Search
  CPC ........ G06F 3/0416; G06F 3/044; G02F 1/338
  See application file for complete search history.

(56) References Cited

U.S. PATENT DOCUMENTS

| 2008/0309627 A1* | 12/2008 | Hotelling et al. | 345/173 |
| 2009/0009483 A1* | 1/2009 | Hotelling et al. | 345/173 |
| 2010/0085330 A1* | 4/2010 | Newton | 345/175 |

* cited by examiner

*Primary Examiner* — Shaheda Abdin
(74) *Attorney, Agent, or Firm* — Alston & Bird LLP (57) ABSTRACT

A touch panel, which includes a plurality of signal input ends and a plurality of signal output ends, where the touch panel further includes at least one signal detecting unit which includes: a signal inputting unit, a preamplifier, and a signal separating unit; where the signal inputting unit is configured to input driving signals respectively having n frequencies, where n is an integer not less than 2; the preamplifier is configured to acquire the output signals outputted from the touch panel, and amplify and output the signals to the signal separating unit; the signal separating unit, which includes n band-pass filters, is configured to separate the signals respectively having n frequencies. In the touch panels according to embodiments of the present invention, the blind zone of the touch panel can be decreased or even eliminated, thus enlarging the detectable region and greatly improving the detection sensitivity of the touch panel.

14 Claims, 6 Drawing Sheets

TOUCH PANEL AND TOUCH DETECTING METHOD THEREFOR

CROSS-REFERENCES TO RELATED APPLICATIONS

The present application claims the benefit of priority to Chinese Patent Application No. 201210581827.7, entitled "TOUCH PANEL AND TOUCH DETECTING METHOD THEREFOR", filed with the Chinese Patent Office on Dec. 27, 2012, the content of which is incorporated herein by reference in its entirety.

TECHNICAL FIELD

The present invention relates to a touch device, more specifically, to a touch panel with the reduced range of a blind zone and a touch detecting method therefor.

BACKGROUND OF THE INVENTION

As an input medium, a touch panel has been the simplest, most convenient and natural human-machine interaction manner, and hence has been increasingly applied to various electronic products, such as mobile phones, laptops, and MP3/MP4 players.

Figure 1:
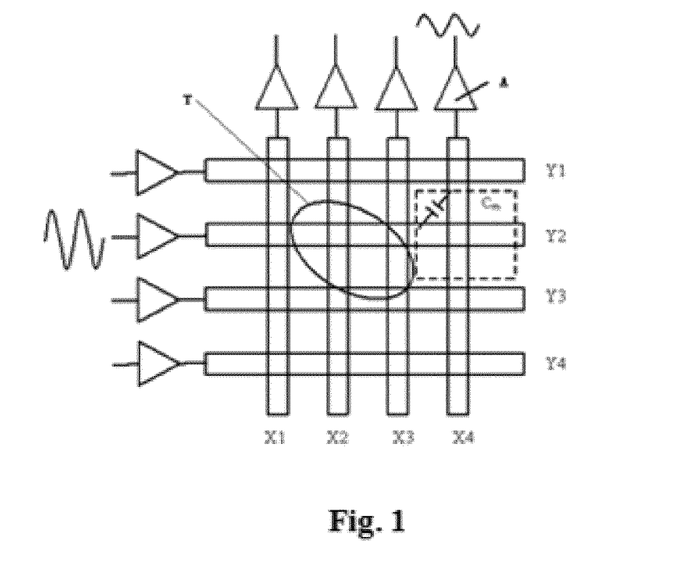
FIG. 1 is a schematic diagram showing the structure of a typical mutual capacitive touch panel in the prior art.

As shown in FIG. 1 which is a schematic diagram showing the structure of a mutual capacitive touch panel in the prior art, the touch panel includes a plurality of driving lines (such as driving lines Y1 to Y4) and a plurality of sensing lines (such as sensing lines X1 to X4) intersecting orthogonally with the plurality of driving lines, and one of sub-pixels in the touchscreen is shown within the dotted box. The capacitance generated at the intersection part between the driving line and the sensing line cannot be changed by an external touching object, but outputs steady background noise or a Direct Current (DC) component to a preamplifier A. The spatial fringe electric field produced by the non-electrode intersection part between the driving line and the sensing line forms a mutual capacitor Cm, which would be directly affected by the external touching object.

The working principle of the typical mutual capacitive touch panel shown in FIG. 1 is briefly described as follows. Driving signals having a specific frequency are sequentially inputted via ends of the driving lines, and the preamplifier A connected to an end of each of the sensing lines receives and amplifies a signal having the same frequency which is sensed by the mutual capacitor Cm between the driving line and the sensing line. When a finger touches the surface of the touch panel, parasitic capacitors are formed between the finger and the driving electrodes as well as between the finger and the sensing electrodes, and a part of the signal having the same frequency would be leaked from the parasitic capacitors to the ground directly through the body or the grounded object, so that the signal to be received by the preamplifier A is attenuated. Based on the design for the electrodes of the touch panel, the driving signal frequency, and the distance between the finger and the electrode of the touch panel, the driving signal may also be coupled from the driving line to the sensing line through the finger as a medium, thus enlarging the signal to be received by the preamplifier A. In such two signal sensing modes, the specific position touched by the finger T can be found by sequentially detecting the signal change on each of the sensing lines.

Figure 2:
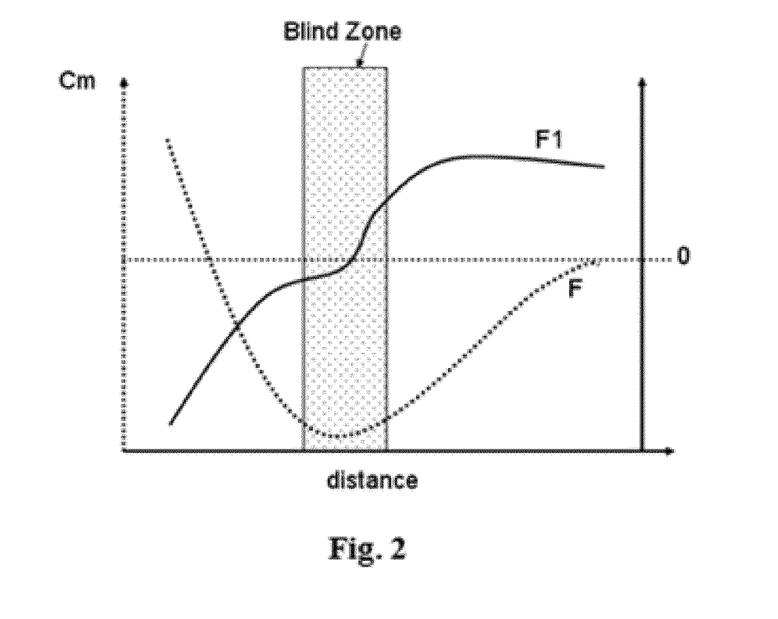
FIG. 2 is a schematic diagram showing experimental curves of response characteristics versus the distance between the finger and the electrode with respect to the mutual capacitive touch panel shown in FIG. 1 under a certain driving signal frequency.

However, the mutual capacitive touch panel shown in FIG. 1 cannot detect all touch signals. Reference is made to FIG. 2, which shows experimental curves of response characteristics versus the distance between the finger and the electrode with respect to the mutual capacitive touch panel shown in FIG. 1 under a certain driving signal frequency. As shown in FIG. 2, a curve F indicates the capacitance of the mutual capacitor Cm versus the distance between the finger and the electrode, and a curve F1 is the differential of the curve F, indicating the touch sensitivity. When the finger is close to the electrode, the capacitance of the mutual capacitor Cm decreases with the increase of the distance between the finger and the electrode. When the finger is at a certain distance to the electrode, the capacitance of the mutual capacitor Cm decreases to be close to the background noise value, and then, the capacitance of the mutual capacitor Cm is increased to a certain value with the increase of the distance between the finger and the electrode. Accordingly, the curve F is divided into both positive and negative parts, and it can be considered that the touch panel has positive and negative operating modes. However, when the capacitance of the mutual capacitor Cm is very close to the background noise value, the change of the capacitance of the mutual capacitor Cm is undetectable by the touch panel in both of the positive and negative operating modes, and such a region is called a blind zone for the detection.

BRIEF SUMMARY OF THE INVENTION

To solve the technical problem of the inherent blind zone of detection in the touch panel in the prior art, the present invention provides a touch panel, which includes a plurality of signal input ends and a plurality of signal output ends, where the touch panel further includes at least one signal detecting unit which includes:

a signal inputting unit, a preamplifier, and a signal separating unit;

where the signal inputting unit, which is connected to a signal input end of the touch panel, is configured to input driving signals respectively having n frequencies, where n is an integer not less than 2;

the preamplifier, which is connected to a signal output end of the touch panel, is configured to acquire the output signals outputted from the touch panel, and amplify and output the signals to the signal separating unit;

the signal separating unit, which is connected to the preamplifier and includes n band-pass filters, is configured to separate the signals respectively having n frequencies.

Preferably, the positive input terminal of the preamplifier is connected to a bias voltage, and the negative input terminal of the preamplifier is connected to the signal input end of the touch panel.

Preferably, the preamplifier further includes a feedback network, which includes at least two feedback branches connected in parallel, where one of the feedback branches includes a resistor, and each of remaining feedback branches includes a resistor and a switch connected in series with the resistor, and the resistance of the feedback network is changed by controlling the On-Off of the switches.

Preferably, the preamplifier further includes a compensating network, which includes a compensating resistor, and the negative input terminal of the preamplifier is connected to a compensating signal source via the compensating resistor.

Preferably, the touch panel is a mutual capacitive touch panel and includes a plurality of driving lines arranged along a first direction and a plurality of sensing lines arranged along a second direction, where the plurality of driving lines are arranged across with and insulated from the plurality of sensing lines; and the signal inputting unit is connected to the driving line of the touch panel, and the sensing line of the touch panel is connected to the preamplifier.

Preferably, the touch panel is a self-capacitive touch panel and includes a plurality of first sensing lines arranged along a first direction and a plurality of second sensing lines arranged along a second direction, where the plurality of first sensing lines are arranged across with and insulated from the plurality of second sensing lines;

the signal inputting unit is connected to both an input end of the first sensing line and an input end of the second sensing line; and the preamplifier is connected to both an output end of the first sensing line and an output end of the second sensing line.

Preferably, the signal inputting unit inputs the driving signals respectively having n frequencies in such a manner that the driving signals respectively having n frequencies are simultaneously inputted to the input ends, or are sequentially inputted to the input ends in different time periods.

Preferably, the driving signals respectively having n frequencies are inputted to one of the signal input ends of the touch panel, then are inputted to next one of the signal input ends of the touch panel; or a driving signal having a first one of the n frequencies is sequentially inputted to all the signal input ends of the touch panel, then a driving signal having a second one of the n frequencies is sequentially inputted to all the signal input ends of the touch panel, until a driving signal having the nth one of the n frequencies is sequentially inputted to all the signal input ends of the touch panel.

Preferably, C signal detecting units share the same signal separating unit, where C is an integer, not less than 2 but not greater than the number of the output ends of the touch panel.

Preferably, each of the C signal detecting units further includes a selector switch, where the source of the selector switch is connected to the output end of the preamplifier, the drain of the selector switch is connected to the input end of the signal separating unit, and the gate of the C selector switch is connected to the same shift register, where the On-Off of the selector switch is controlled by the shift register in order to select the signal from the output end of one of the preamplifiers to be outputted to the signal separating unit.

Preferably, D signal detecting units share one preamplifier and one signal separating unit, where D is an integer not less than 2 but not greater than the number of the output ends of the touch panel.

Preferably, each of the D signal detecting units further includes one selector switch, where the source of the selector switch is connected to the output end of the touch panel, the drain of the D selector switch is connected to the input end of the same preamplifier, the gate of the D selector switch is connected to the same shift register, and the output end of the preamplifier is connected to the input end of the signal separating unit, and the On-Off of the selector switches is controlled by the shift register in order to select the signal from one of the output ends of the touch panel to be outputted to the preamplifier, then to the signal separating unit from the preamplifier.

Preferably, the band-pass filter is a narrow band-pass filter.

Preferably, the inputted signals respectively having the n frequencies are compensated, so that amplitudes of the signals outputted to the signal separating unit are consistent with each other.

Preferably, the inputted signals respectively having the n frequencies are compensated, so that phases of the signals outputted to the signal separating unit are consistent with each other.

With the above technical means, the present invention can achieve the following technical effects:

1. in the touch panel which is driven by signals respectively having n frequencies, the blind zone of the touch panel can be decreased or even eliminated, thus enlarging the detectable region and greatly improving the detection sensitivity of the touch panel.

2. the touch signal is detected by means of the driving signals respectively having n frequencies, so that the driver chip can have a wider detection range so as to improve the universality thereof, so that the same driver chip may be applied to a variety of touch panels, thereby reducing the costs of development and production of the driver chip and the costs of the touch panel.

3. the plurality of signal detecting units may share the same signal separating unit, or the plurality of signal detecting units may share the same preamplifier and the same signal separating unit, thus reducing the complexity of the circuit, while reducing the manufacturing difficulty and saving the costs.

DETAILED DESCRIPTION OF THE INVENTION

For the sake of better understanding on the above objects, features and advantages of the present invention, the specific embodiments of the present invention will be described in detail below with reference to accompanying drawings.

A First Embodiment

Figure 3:
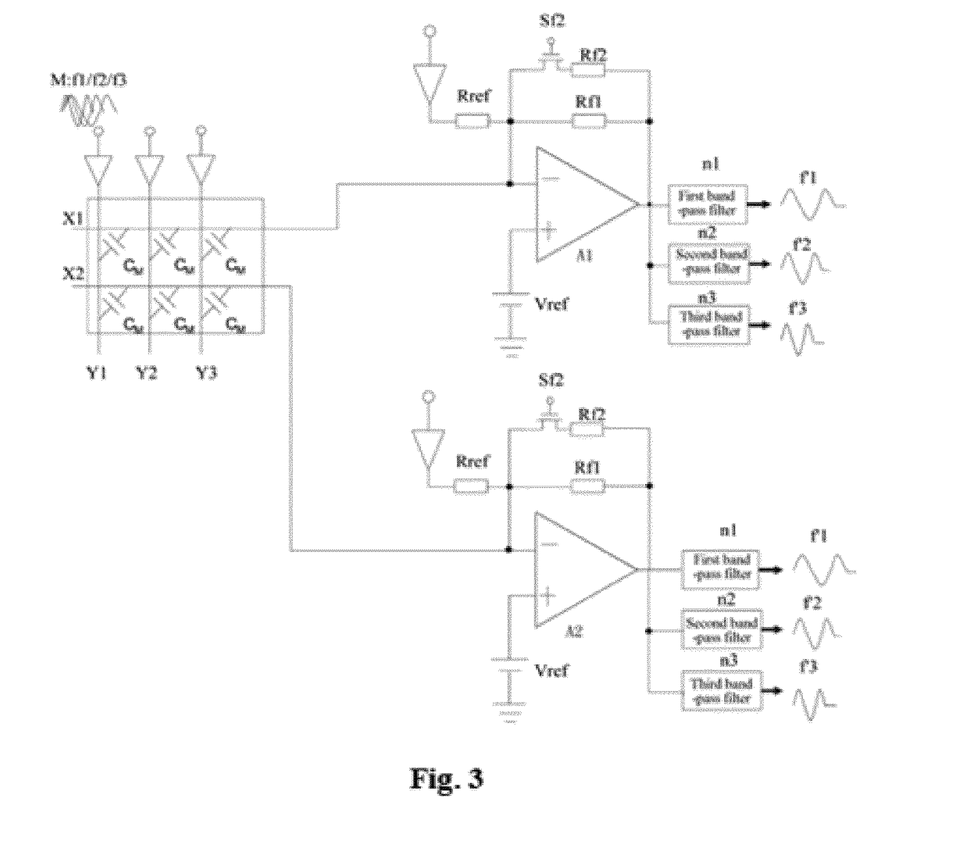
FIG. 3 is a schematic diagram showing a touch panel according to a first embodiment.

FIG. 3 shows a touch panel according to the first embodiment of the present invention. In the first embodiment, the touch panel is a mutual capacitive touch panel and includes a plurality of driving lines and a plurality of sensing lines arranged across with the driving lines, and only three driving lines Y1, Y2 and Y3, and two sensing lines X1 and X2 are shown in FIG. 3. The driving lines Y1, Y2 and Y3 are arranged in the vertical direction while the sensing lines X1 and X2 are arranged in the horizontal direction, and a mutual capacitor Cm is formed by a fringe electric field between a driving line and its adjacent sensing line. Driving signals are inputted to the touch panel via input ends of the driving lines Y1, Y2 and Y3, that is, the input ends of the driving lines Y1, Y2 and Y3 function as signal input ends of the touch panel; and sensing signals are outputted from the touch panel via output ends of the sensing lines X1 and X2, that is, the output ends of the sensing lines X1 and X2 function as signal output ends of the touch panel.

The touch panel further includes a plurality of signal detecting units, each of which includes a signal inputting unit, a preamplifier and a signal separating unit. The signal inputting unit M, which is connected to input ends of the driving lines Y1, Y2 and Y3 of the touch panel, is configured to sequentially input driving signals to the driving lines Y1, Y2 and Y3. The driving signals outputted from the signal inputting unit M consist of driving signals respectively having n frequencies, where n is an integer not less than 2, and is equal to 3 in the present embodiment, thus the n frequencies consist of three frequencies, i.e. frequencies f1, f2, and f3, respectively.

The output end of each of the sensing lines X1 and X2 is connected to one preamplifier, as shown in FIG. 3, the output end of the sensing line X1 is connected to the negative input terminal of the preamplifier A1, and the output end of the sensing line X2 is connected to the negative input terminal of the preamplifier A2. The output end of each of the preamplifiers A1 and A2 is connected to one signal separating unit respectively.

The signal separating unit includes n (which is equal to the number of the inputted driving signal frequencies) band-pass filters, and in the present embodiment, each of the signal separating units includes three band-pass filters, namely, a first band-pass filter n1, a second band-pass filter n2 and a third band-pass filter n3, where filtering ranges of the three band-pass filters respectively correspond to the three frequencies f1, f2, and f3 in a one-to-one relationship, that is, a signal having the frequency f1 can be detected and separated out by the first band-pass filter n1, a signal having the frequency f2 can be detected and separated out by the second band-pass filter n2, and a signal having the frequency f3 can be detected and separated out by the third band-pass filter n3.

Preferably, the three band-pass filters are narrow band-pass filters, that is, the first band-pass filter n1 detects and separates out a signal having the frequency f1 only without passing other signals; similarly, the second and third band-pass filters n2 and n3 detect and separate out respectively a signal having the frequency f2 and a signal having the frequency f3 only without passing other signals.

After the signal inputting unit M has simultaneously inputted the driving signals respectively having frequencies f1, f2 and f3 to the driving line Y1, the signal input to the driving line Y1 is completed, then the signal inputting unit M simultaneously inputs the driving signals respectively having frequencies f1, f2 and f3 to the driving line Y2, . . . , until the signal inputting unit M simultaneously inputs the driving signals respectively having frequencies f1, f2 and f3 to the last driving line, then one detection cycle is completed. When the signal inputting unit M simultaneously inputs the driving signals respectively having frequencies f1, f2 and f3 to each of the driving lines Y1, Y2 and Y3, detected signals are outputted from the sensing lines X1 and X2 to the preamplifiers A1 and A2 and delivered to the respective signal separating units through the preamplifiers A1 and A2, and then the signal having the frequency f1 can be detected and separated out by the first band-pass filter n1, the signal having the frequency f2 can be detected and separated out by the second band-pass filter n2, and the signal having the frequency f3 can be detected and separated out by the third band-pass filter n3, in each of the signal separating units.

Figure 4:
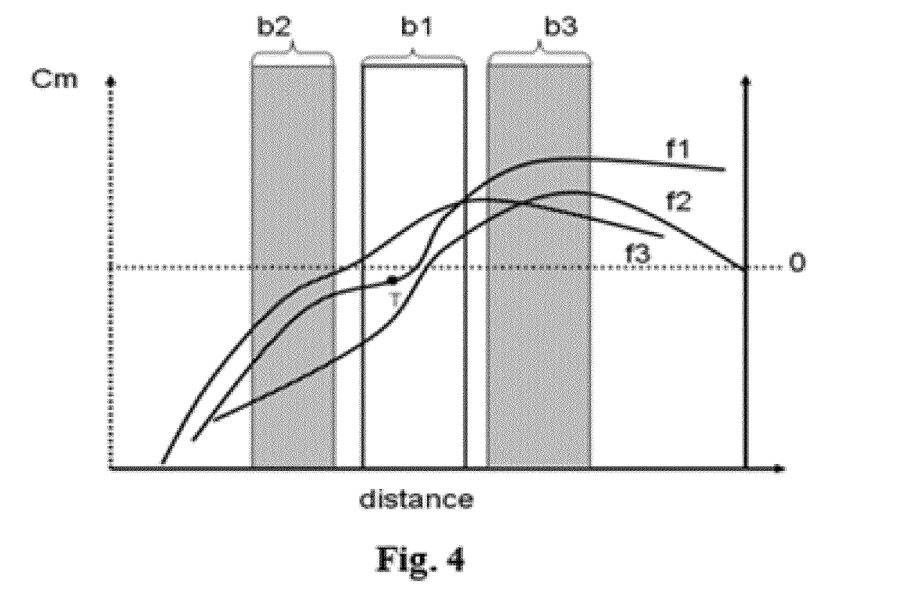
FIG. 4 is a schematic diagram showing experimental curves of response characteristics versus the distance between the finger and the electrode with respect to the mutual capacitive touch panel according to the first embodiment under various driving signal frequencies.

When a touch occurs at a position on the touch panel, a parasite capacitance is formed between the touching object and a driving electrode as well as a sensing electrode, and a part of the detected signal would be leaked from the parasitic capacitor to the ground directly through the body or the grounded object, so that the mutual capacitor Cm at the position is changed, and the signals respectively having frequencies f1, f2 and f3 would be changed accordingly, therefore the touch position is detected. Of course, in accordance with the response curves at the frequencies f1, f2 and f3, certain blind zones b1, b2 and b3 exist for the frequencies f1, f2 and f3 respectively. As shown in FIG. 4 which is a schematic diagram showing experimental curves of response characteristics versus the distance between the finger and the electrode with respect to the mutual capacitive touch panel according to the first embodiment under various driving signal frequencies, as shown in FIG. 4, when a signal T triggered by an touch is within the blind zone b1, the touch is undetectable by the frequency f1, but the position where the touch occurs may be detected by the frequency f2 or f3.

Similarly, when the signal change triggered by the touch is undetectable by the frequency f2, the position where the touch occurs may be detected by the frequency f1 or f3; and when the signal change triggered by the touch is undetectable by the frequency f3, the position where the touch occurs may be detected by the frequency f1 or f2.

As for the touch panel, any region where a signal is undetectable by all the frequencies f1, f2 and f3 is regarded as the blind zone of the touch panel, that is, the intersected region among the blind zones b1, b2 and b3 for the frequencies f1, f2 and f3 is the blind zone of the touch panel. With the properly selected number and ranges of the driving signal frequencies, the range of the blind zone of the touch panel can be greatly decreased and even eliminated. As shown in FIG. 4, in the first embodiment, no intersected region exists among the blind zones b1, b2 and b3 for the frequencies f1, f2 and f3, that is, the touch sensitivity of the touch panel is high and no blind zone exists in the touch panel.

In the touch panel according to the first embodiment, which is driven by signals respectively having n frequencies, the blind zone of the touch panel can be decreased or even eliminated, thus enlarging the detectable region and greatly improving the detection sensitivity of the touch panel.

Preferably, in the present embodiment, signals respectively having the frequencies f1, f2 and f3 that are delivered to the detecting unit have relatively unified characteristics, for example, consistent amplitudes and phases, so that the crosstalk among the three frequencies would be reduced. It is noted that the touch panel is subject to different delays or attenuations with respect to different driving signal frequencies. Thus, in order to obtain unified output characteristics, the inputted signals of the frequencies f1, f2 and f3 may be compensated respectively, for example, by changing the amplitude of the signal of the frequency f1, f2 or f3, changing the initial phase of the signal of the frequency f1, f2 or f3, and so on, so that the signal of the frequencies have unified characteristics when outputted from the touch panel.

Preferably, in the first embodiment, the preamplifier further includes a feedback network, which includes at least two feedback branches connected in parallel, where one of the feedback branches includes a resistor, and each of remaining feedback branches includes a resistor and a switch connected in series with the resistor, and the resistance of the feedback network may be changed by controlling the On-Off of the switch.

Next, the first preamplifier A1 will be described, for example. Referring to FIG. 3, the feedback network included in the first preamplifier A1 includes two feedback branches, a first feedback branch of which includes a first resistor Rf1, and a second feedback branch of which includes a second resistor Rf2 and a first switch Sf2 connected in series with the second resistor Rf2. When the first switch Sf2 is on, the feedback network includes two resistors connected in parallel (i.e. the first resistor Rf1 and the second resistor Rf2); and when the first switch Sf2 is off, the feedback network includes the first resistor Rf1 only. That is, the resistance of the feedback network is changed by controlling the On-Off of the first switch Sf2.

The preamplifier A1 also includes a compensating network, which includes a compensating resistor Rref, and the negative input terminal of the preamplifier A1 is connected to a compensating signal source via the compensating resistor Rref. The compensating network mainly serves to compensate for, when no signal is outputted from the sensing line of the touch panel, the output signal of the preamplifier A1 in order to prevent the output end of the preamplifier from outputting a signal, which causes a false determination that a sensing signal is present in the touch panel.

The feedback network of the second preamplifier A2 is the same with that of the first preamplifier A1 and will not be discussed in detail here.

In the first embodiment, the signal inputting unit M inputs the driving signals to the driving lines in such a manner that signals respectively having all of the frequencies are once inputted to one of the driving lines, and then to the next one of the driving lines. In other embodiments, it is also possible that a signal having a first one of the frequencies is sequentially inputted to all the driving lines, then a signal having a second one of the frequencies is sequentially inputted to all the driving lines, . . . , until the signals respectively having all of the frequencies have been inputted, then one detection cycle is finished. Such a manner in the other embodiments may achieve the same technical effect as that discussed in the first embodiment.

In the first embodiment, the signal inputting unit M inputs the driving signals to the driving lines in such a manner that signals respectively having the frequencies f1, f2 and f3 are simultaneously inputted. In other embodiments, the signals respectively having the frequencies f1, f2 and f3 are inputted in different time periods, respectively. Specifically, the time duration for inputting the driving signals is separated into three time periods in advance, and the corresponding relationship between the three time periods and the driving signals respectively having the three frequencies is established, and the driving signal corresponding to each of the time periods is inputted in the time period. Such a manner that the signals respectively having different frequencies are respectively inputted in different time periods may also achieve the same detection effect as that discussed in the first embodiment. Furthermore, since the signal having only one of the frequencies is operated in the touch panel at a time, the mutual crosstalk between different frequencies can be reduced, obtaining a more accurate detection result.

In the first embodiment, the signal detecting unit is integrated in a driver chip of the touch panel. In general, the driving lines and the sensing lines of the touch panel may be disposed on an individual substrate, and then the substrate is combined with a flat panel display device to form a touch display device; or, the driving lines and sensing lines may also be directly integrated in the flat panel display device, but the signal detecting unit is typically integrated in the driver chip. Since the properties, such as the thickness of the film layer, the distance between the electrodes, the thickness of the substrate are different among different touch panels and would affect the touch sensitivity, a driver chip which matches with each of the touch panels generally needs to be developed in the prior art, that is, the driver chip has very low universality.

However, in the touch panel according to the first embodiment, the touch signal is detected by means of the driving signals respectively having n frequencies, so that the driver chip can have a wider detection range so as to improve the universality thereof, so that the same driver chip may be applied to a variety of touch panels, thereby reducing the costs of development and production of the driver chip and the cost of the touch panel.

A Second Embodiment

Figure 5:
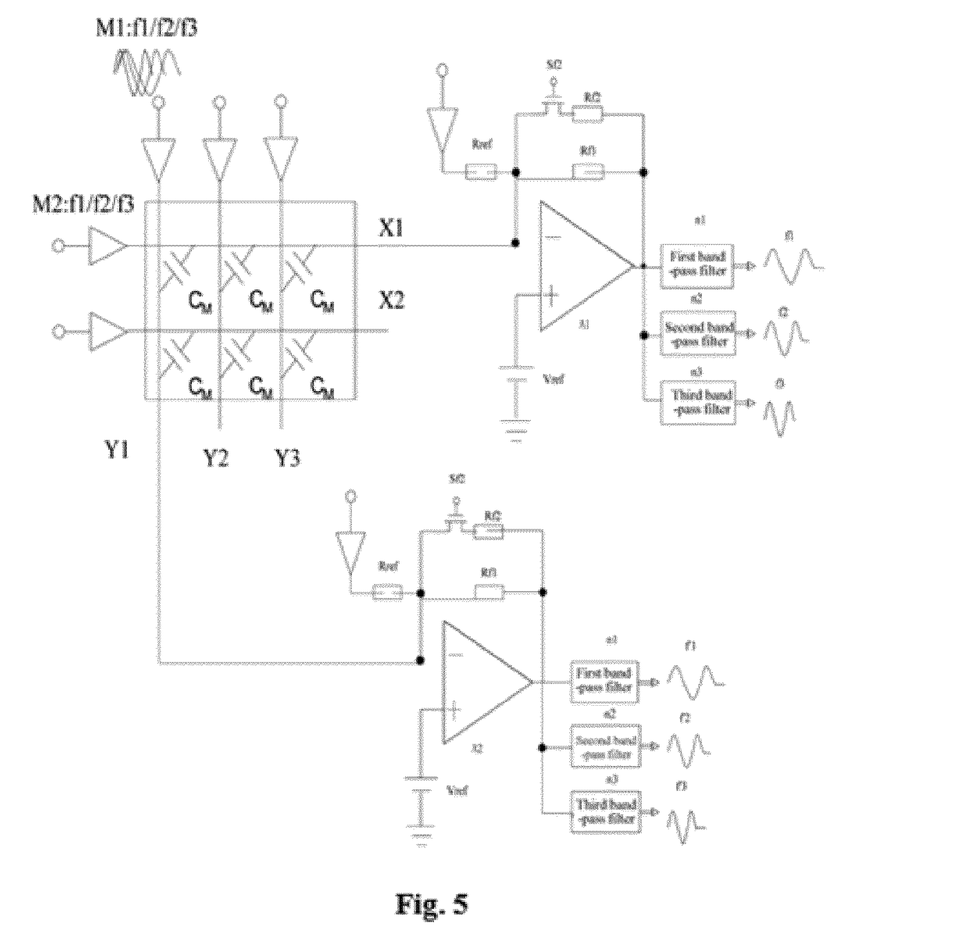
FIG. 5 is a schematic diagram showing a self-capacitive touch panel according to a second embodiment.

The second embodiment is different from the first embodiment in that the touch panel is a self-capacitive touch panel. Reference is made to FIG. 5, which is a schematic diagram showing the self-capacitive touch panel according to the second embodiment. As shown in FIG. 5, the touch panel includes a plurality of first sensing lines arranged along a first direction and a plurality of second sensing lines arranged along a second direction, where the plurality of first sensing lines are arranged across with and insulated from the plurality of second sensing lines. Only three first sensing lines Y1, Y2 and Y3 and two second sensing lines X1 and X2 are shown in FIG. 5. The first sensing lines Y1, Y2 and Y3 are arranged in the vertical direction, and the second sensing lines X1 and X2 are arranged in the horizontal direction.

A first driving signal is inputted to the touch panel via the input end of the first sensing line, and an output signal is detected at the output end of the first sensing line. When a touch occurs, which is equivalent to that the self-capacitance of the first sensing line at the touch position is changed, the signal detected at the output end of the first sensing line is hence changed, thus a Y-coordinate of the touch position can be determined. A second driving signal is inputted to the touch panel via the input end of the second sensing line, and an output signal is detected at the output end of the second sensing line. When a touch occurs, which is equivalent to that the self-capacitance of the second sensing line at the touch position is changed, the signal detected at the output end of the second sensing line is hence changed, thus an X-coordinate of the touch position can be determined. By combining the X-coordinate with the Y-coordinate, the position where the touch occurs (i.e. the touch position) can be determined. In the second embodiment, the input ends of the first sensing line and the second sensing line function as the input ends of the touch panel, and the output ends of the first sensing line and the second sensing line function as the output ends of the touch panel.

The input end of each of the sensing lines is connected to a signal inputting unit, specifically, the input ends of the first sensing lines are connected to the signal inputting unit M1, and the input ends of the second sensing lines are connected to the signal inputting unit M2. The signal inputting units M1 and M2 are used to input driving signals respectively having n frequencies to the first sensing lines and the second sensing lines, respectively.

The output end of each of the sensing lines is connected to a preamplifier, as shown in FIG. 5, the output end of the first sensing line Y1 is connected to the negative input terminal of the preamplifier A1, and the output end of the second sensing line X1 is connected to the negative input terminal of the preamplifier A2. Likewise, other sensing lines are also connected to the corresponding preamplifiers, but FIG. 5 only schematically shows the preamplifiers A1 and A2.

Each of the preamplifiers is connected to a signal separating unit, where the signal separating unit includes n (which is equal to the number of inputted driving signal frequencies) band-pass filters, and in the second embodiment, each of the signal separating units includes three band-pass filters, namely, a first band-pass filter n1, a second band-pass filter n2 and a third band-pass filter n3, where filtering ranges of the three band-pass filters respectively correspond to the three frequencies f1, f2 and f3 in a one-to-one relationship, that is, the first band-pass filter n1 detects and separates out a signal having the frequency f1 only without passing other signals; similarly, the second and third band-pass filters n2 and n3 detect and separate out respectively a signal having the frequency f2 and a signal having the frequency f3 only without passing other signals.

In the touch panel according to the second embodiment, the driving signals respectively having three different frequencies are employed to drive the touch panel. Although an inherent blind zone is present with respect to each of the frequencies, as for the touch panel, any region where a signal is undetectable by all the frequencies f1, f2 and f3 is regarded as the blind zone of the touch panel, that is, the intersected region among the blind zones for the frequencies f1, f2 and f3 is the blind zone of the touch panel. With the properly selected number and ranges of the driving signal frequencies, the range of the blind zone of the touch panel can be greatly decreased and even eliminated.

In the second embodiment, the preamplifier further includes a feedback network and a compensating network, the specific structures and advantages of which are the same with those of the feedback network and the compensating network as discussed in the first embodiment and will not be discussed in detail here, and reference may be made to the first embodiments for details.

Optionally, the signal inputting units M1 and M2 input the driving signals to the first sensing lines and the second sensing lines respectively in such a manner that the signals respectively having all of the frequencies are once inputted to one of the sensing lines, and then to the next one of the sensing lines; it is also possible that the signal having a first one of the frequencies is sequentially inputted to all the sensing lines, then a signals having a second one of the frequencies is sequentially inputted to all the sensing lines, until the signals respectively having all of the frequencies have been inputted. Both of the above manners may achieve the same technical effect.

Optionally, the signal inputting units M1 and M2 input the driving signals to the first sensing lines and the second sensing lines respectively in such a manner that the signals respectively having the frequencies f1, f2 and f3 are simultaneously inputted; the manner that the signals respectively having the frequencies f1, f2 and f3 are inputted in different time periods, respectively, may also be selected. Both of the manners can achieve the same technical effect. With the manner that the signals respectively having the frequencies f1, f2 and f3 are inputted in different time periods, respectively, since the signal having only one of the frequencies is operated in the touch panel at a time, the mutual crosstalk between different frequencies can be reduced, obtaining a more accurate detection result.

A Third Embodiment

It can be seen from the first embodiment and the second embodiment that one signal detecting unit of the touch panel corresponds to one output end, each of the signal detecting units is provided with n band-pass filters. If the touch panel is provided with many output ends, i.e., many sensing lines, or many first sensing lines or second sensing lines, the circuit structure would be very complex, especially for the case of the self-capacitive touch panel in which the number of the signal detecting units is doubled. In view of this, in order to reduce the complexity of the circuit structure, a third embodiment of the present invention also provides a touch panel, in which C signal detecting units share the same signal separating unit, where C is an integer not less than 2 but not greater than the number of the output ends of the touch panel.

Figure 6:
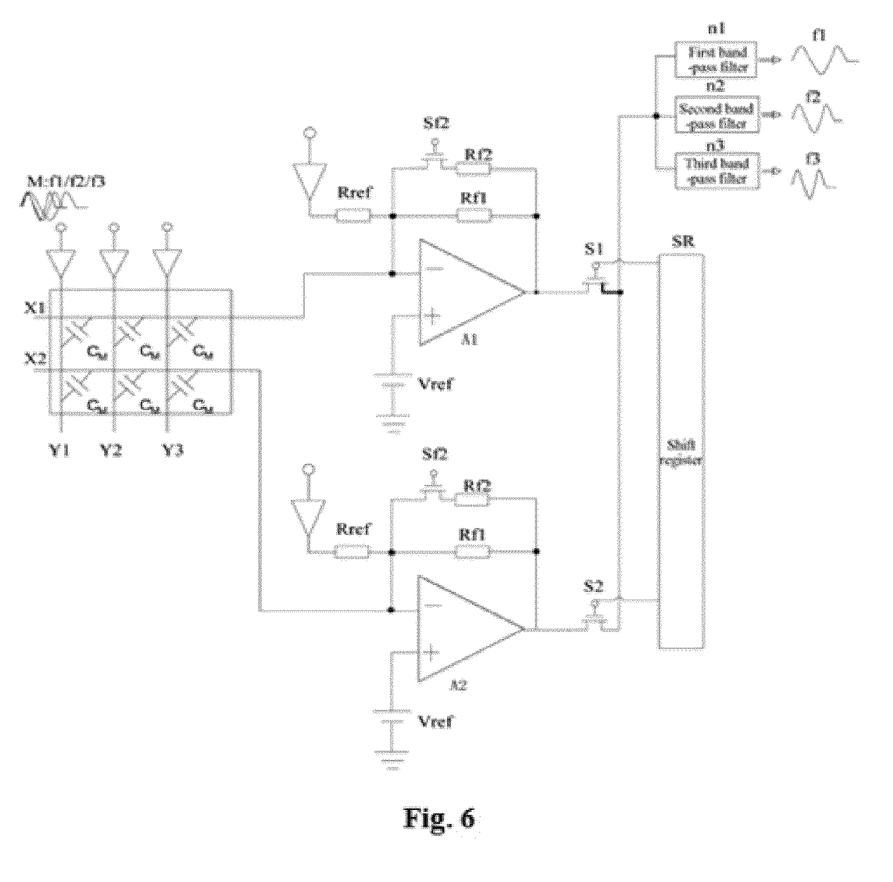
FIG. 6 is a schematic diagram showing a mutual capacitive touch panel according to a third embodiment.

Referring to FIG. 6, the touch panel according to third embodiment will be illustrated as a mutual capacitive touch panel, for example.

Also, only three driving lines Y1, Y2 and Y3 and two sensing lines X1 and X2 are shown in the third embodiment. In the third embodiment, the input ends of the driving lines Y1, Y2 and Y3 serve as the input ends of the touch panel, and the output ends of the sensing lines X1 and X2 serve as the output ends of the touch panel.

The touch panel further includes two signal detecting units, each of which includes a signal inputting unit and a preamplifier, and which share a signal separating unit. The signal inputting unit M, which is connected to the input ends of the driving lines Y1, Y2 and Y3 of the touch panel, is configured to sequentially input driving signals to the driving lines Y1, Y2 and Y3. The driving signals outputted from the signal inputting unit M consist of driving signals respectively having n frequencies, where n is an integer not less than 2, and is equal to 3 in the present embodiment. The preamplifier, which is connected to the output end of the touch panel, is configured to amplify and deliver the outputted signal to the signal separating unit. The above principles are the same with those in first embodiment and will not be discussed in detail here, and reference may be made to the first embodiment for details.

The third embodiment is different from the first embodiment in that the two signal detecting units share the same signal separating unit. Each of the signal detecting units includes one selector switch. Specifically, as shown in FIG. 6, the drain of the selector switch S1 is connected to the output end of the preamplifier A1, the drain of selector switch S2 is connected to the output end of the preamplifier A2, and both sources of the selector switches S1 and S2 are connected to the input end of the same signal separating unit, while both gates of the selector switches S1 and S2 are connected to a shift register SR. In this way, the closing and opening of the selector switches S1 and S2 can be selectively controlled by the shift register SR, and when the selector switch is off, the detecting signal cannot reach the signal separating unit; and when the switch is on, the detecting signal can reach the signal separating unit. The phase of the pulse signal outputted by the shift register SR may be sequentially delayed by a predetermined period to sequentially close the selector switches selectively, so that the sensing signals from the sensing lines may be processed by only one set of band-pass filters n1, n2, and n3, that is, signals respectively having the different frequencies from the three driving lines Y1, Y2 and Y3 may be respectively separated out by the set of band-pass filters n1, n2, and n3, so that one of the signal separating units in the first embodiment can be eliminated. Therefore, only one set of band-pass filters are required for the purpose of detecting a touch position, thus reducing the complexity of the circuit, while reducing the manufacturing difficulty and saving the costs.

In the present embodiment, two signal detecting units share the same signal separating unit, that is, C=2; in other implementations, C may be not less than 2 but not greater than the number of the output ends of the touch panel, for example, all the signal detecting units may share the same signal separating unit, which simplifies the circuit structure.

A Fourth Embodiment

In the touch panel according to the fourth embodiment, which has a more simplified circuit structure compared with the touch panel of the third embodiment, D signal detecting units share the same preamplifier and the same signal separating unit, where D is not less than 2 but not greater than the number of the output ends of the touch panel. Specifically, reference is made to FIG. 7, which is a schematic diagram showing the touch panel according to the fourth embodiment.

Figure 7:
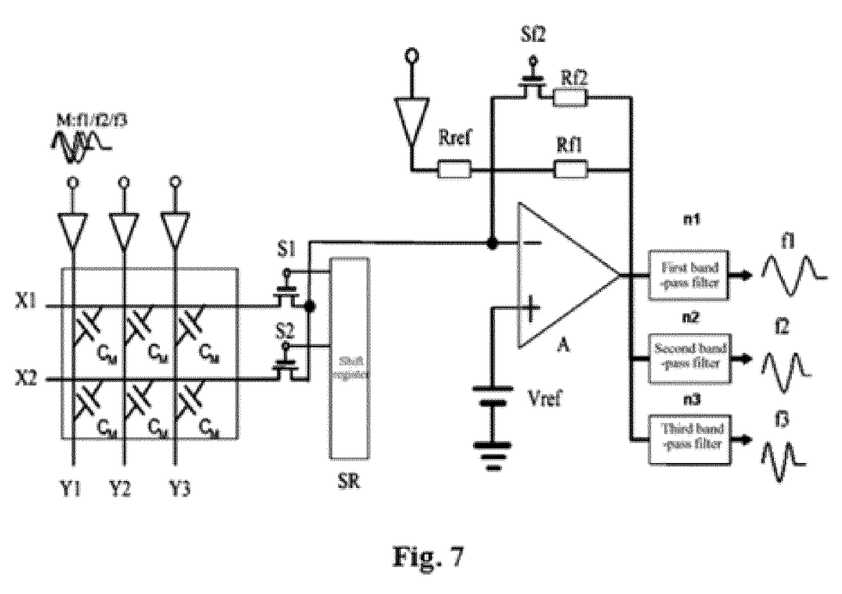
FIG. 7 is a schematic diagram showing a touch panel according to a fourth embodiment.

Also, only three driving lines Y1, Y2 and Y3 and two sensing lines X1 and X2 are shown in the fourth embodiment. In the fourth embodiment, the input ends of the touch panel are formed by the input ends of the driving lines Y1, Y2 and Y3, and the output ends of the touch panel are formed by the output ends of the sensing lines X1 and X2. The touch panel further includes two signal detecting units.

The two signal detecting units share the same preamplifier and the same signal separating unit. Specifically, as shown in FIG. 7, each of the signal detecting units further includes a selector switch, for example, the signal detecting units includes selector switches S1 and S2, where each of the sources of the selector switches S1 and S2 is connected to one of output ends of the touch panel, the drains of the selector switches S1 and S2 are connected to the input end of the same preamplifier A, the gates of the selector switches S1 and S2 are connected to the same shift register SR, the output end of the preamplifier A is connected to the input end of one signal separating unit, and the On-Off of the selector switches S1 and S2 may be selectively controlled by the shift register SR, to select the signal from one of the output ends of the touch panel to be delivered to the preamplifier, then to the signal separating unit through the preamplifier. The phase of the pulse signal outputted by the shift register SR may be sequentially delayed by a predetermined period to sequentially turn on the selector switches S1 and S2 selectively, so that the sensing signals from the sensing lines are sequentially outputted to the negative input terminal of the preamplifier A and the signal separating unit, so that two signal detecting unit can share only one preamplifier and one signal separating unit, thus simplifying the circuit In the fourth embodiment, the two signal detecting units share one preamplifier and one signal separating unit, but in other implementations, a plurality of signal detecting units (which number is not less than 2 but not larger than that of the output ends of the touch panel) can share one preamplifier and one signal separating unit, so that the number of the preamplifiers can be reduced, that is, only one preamplifier is required to be disposed at the output ends of all the sensing lines, thus greatly reducing the complexity of the circuit, while reducing the control difficulty and saving the costs.

The preferred embodiments of the present invention are described as above. However, it should be noted that any improvements and modifications can be made by those skilled in the art without departing from the principle of the present invention, and these improvements and modifications should be intended to fall with the scope of protection of the present invention.

What is claimed is:

1. A touch panel comprising a plurality of signal input ends and a plurality of signal output ends, wherein the touch panel further comprises at least one signal detecting unit which comprises:

a signal inputting unit, a preamplifier, and a signal separating unit;

wherein the signal inputting unit, which is connected to a signal input end of the touch panel, is configured to input driving signals respectively having n frequencies, wherein n is an integer not less than 2;

the preamplifier, which is connected to a signal output end of the touch panel, is configured to acquire the output signals outputted from the touch panel, and amplify and output the output signals to the signal separating unit;

the signal separating unit, which is connected to the preamplifier and comprises n band-pass filters, is configured to separate the signals respectively having n frequencies, wherein, the preamplifier further comprises a feedback network, wherein the feedback network comprises at least two feedback branches connected in parallel, wherein one of the feedback branches comprises a resistor, and each remaining feedback branch comprises a resistor and a switch connected in series, and the resistance of the feedback network is changed by controlling the switches.

2. The touch panel of claim 1, wherein a positive input terminal of the preamplifier is connected to a bias voltage, and a negative input terminal of the preamplifier is connected to the signal input end of the touch panel.

3. The touch panel of claim 1, wherein the preamplifier further comprises a compensating network, which comprises a compensating resistor, and a negative input terminal of the preamplifier is connected to a compensating signal source via the compensating resistor.

4. The touch panel of claim 1, wherein the touch panel is a mutual capacitive touch panel and comprises a plurality of driving lines arranged along a first direction and a plurality of sensing lines arranged along a second direction, wherein the plurality of driving lines are arranged across with and insulated from the plurality of sensing lines; and the signal inputting unit is connected to the driving line of the touch panel, and the sensing line of the touch panel is connected to the preamplifier.

5. The touch panel of claim 1, wherein the touch panel is a self-capacitive touch panel and comprises a plurality of first sensing lines arranged along a first direction and a plurality of second sensing lines arranged along a second direction, wherein the plurality of first sensing lines are arranged across with and insulated from the plurality of second sensing lines;

the signal inputting unit is connected to both an input end of the first sensing line and an input end of the second sensing line; and the preamplifier is connected to both an output end of the first sensing line and an output end of the second sensing line.

6. The touch panel of claim 1, wherein the signal inputting unit inputs the driving signals respectively having n frequencies in such a manner that the driving signals respectively having n frequencies are simultaneously inputted to the input ends, or are sequentially inputted to the input ends in different time periods.

7. The touch panel of claim 1, wherein the driving signals respectively having n frequencies are inputted to one of the signal input ends of the touch panel, then are inputted to next one of the signal input ends of the touch panel; or a driving signal having a first one of the n frequencies is sequentially inputted to all the signal input ends of the touch panel, then a driving signal having a second one of the n frequencies is sequentially inputted to all the signal input ends of the touch panel, until a driving signal having the nth one of the n frequencies is sequentially inputted to all the signal input ends of the touch panel.

8. The touch panel of claim 1, wherein C signal detecting units share the same signal separating unit, wherein C is an integer, not less than 2 but not greater than the number of the output ends of the touch panel.

9. The touch panel of claim 8, wherein each of the C signal detecting units further comprises a selector switch,
the source of the selector switch is connected to the output end of the preamplifier,
the drain of the selector switch is connected to the input end of the signal separating unit, and
the gate of the C selector switches is connected to the same shift register, wherein the On-Off of the selector switch is controlled by the shift register in order to select the signal from the output end of one of the preamplifiers to be outputted to the signal separating unit.

10. The touch panel of claim 1, wherein D signal detecting units share one preamplifier and one signal separating unit, wherein D is an integer not less than 2 but not greater than the number of the output ends of the touch panel.

11. The touch panel of claim 10, wherein each of the D signal detecting units further comprises one selector switch, wherein the source of the selector switch is connected to the output end of the touch panel;
the drain of the D selector switch is connected to the input end of the preamplifier, and the output end of the preamplifier is connected to the input end of the separating unit; and
the gate of the D selector switch is connected to the same shift register, and the On-Off of the selector switch is controlled by the shift register in order to select the signal from one of the output ends of the touch panel to be outputted to the preamplifier, then to the signal separating unit from the preamplifier.

12. The touch panel of claim 1, wherein the band-pass filter is a narrow band-pass filter.

13. The touch panel of claim 1, wherein the inputted signals respectively having the n frequencies are compensated, so that amplitudes of the signals outputted to the signal separating unit are consistent with each other.

14. The touch panel of claim 1, wherein the inputted signals respectively having the n frequencies are compensated, so that phases of the signals outputted to the signal separating unit are consistent with each other.

* * * * *